June 21, 1949.  G. N. TUTTON  2,473,977
ENCLOSING CASE FOR FISHING RODS AND THE LIKE
Filed June 7, 1947
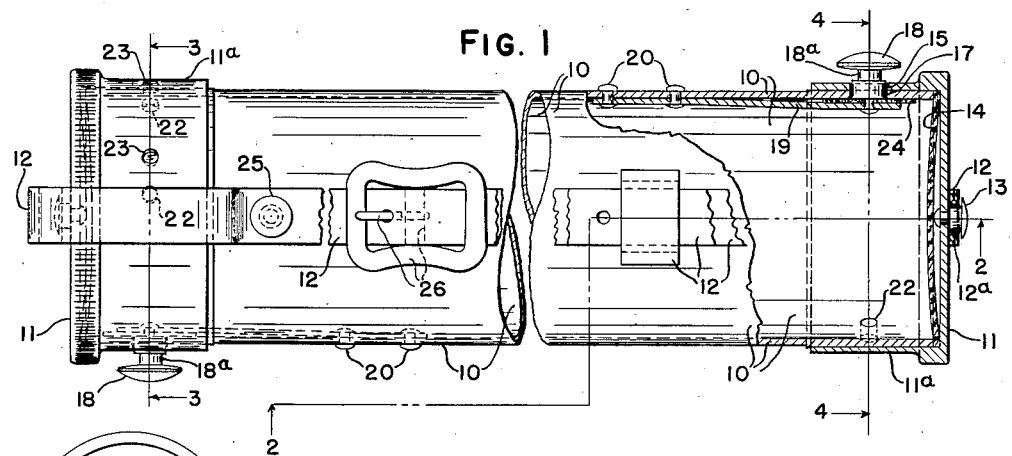
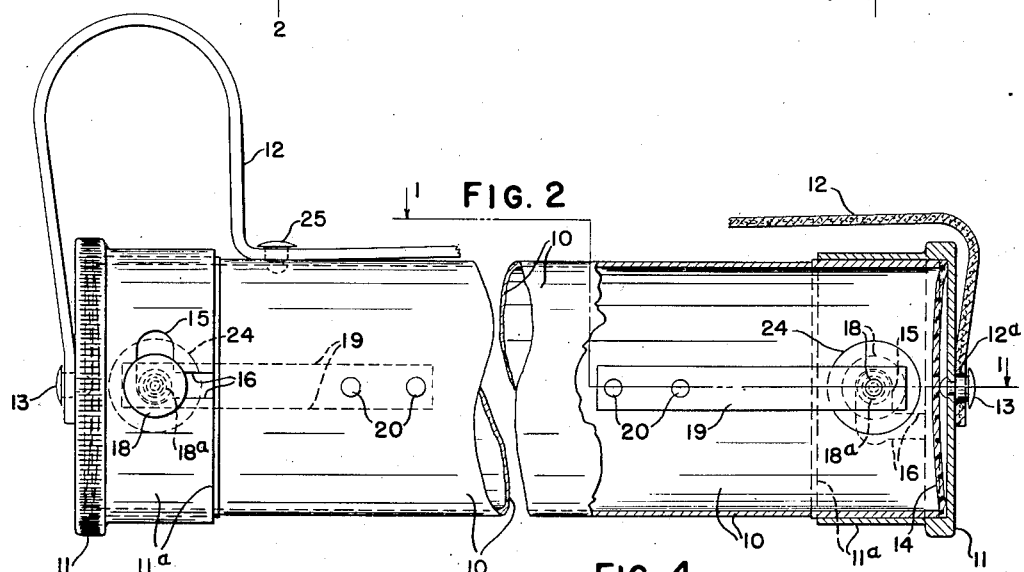
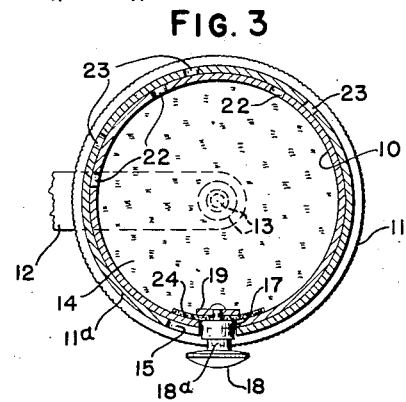
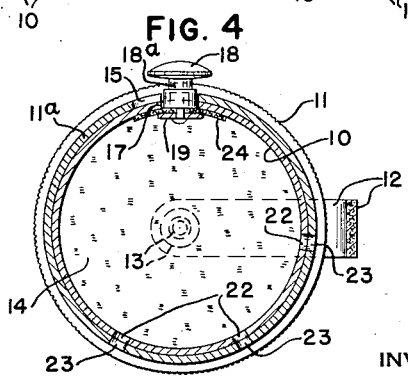
INVENTOR
GORDON N. TUTTON
BY
Theodore E. Simonton
ATTORNEY Patented June 21, 1949

2,473,977

UNITED STATES PATENT OFFICE 2,473,977

ENCLOSING CASE FOR FISHING RODS AND THE LIKE

Gordon N. Tutton, Auburn, N. Y., assignor to Tut, Inc., Auburn, N. Y., a corporation of New York Application June 7, 1947, Serial No. 753,234

7 Claims. (Cl. 224—5)

The general object of the invention is to provide an enclosing case of simple, light, sturdy, durable and inexpensive construction in which fishing rods and the like may be safely stored and safely manually or otherwise transported.

A further object of the invention is to provide a conveniently portable carrying case for disjointed sections of separably jointed fishing rods which is readily convertible from a sealed condition in which the case is adapted to float in water to a condition in which the interior of the case is open to atmosphere through ventilating openings but will safely retain fishing rod sections therein for storage and transportation.

Further objects of the invention are to provide a fishing rod case having a tubular body portion and improved means for holding one, and preferably two, end closures fitted on and releasably latched to said tubular body portion of the case, and to provide improved means for connecting a carrying strap to the tubular body and to the end closures of such a case.

Other objects and advantages of the invention will appear from the following description in detail of the preferred embodiment of the invention illustrated in the accompanying drawing.

In the drawing:

Figure 1 is a view partly in elevation and partly in section on the line 1—1 of Figure 2, showing a fishing rod case embodying the invention;

Figure 2 is a view of the case partly in section on the line 2—2 of Figure 1;

Figure 3 is a sectional view taken on the line 3—3 of Figure 1; and

Figure 4 is a sectional view taken on the line 4—4 of Figure 1.

The fishing rod case shown comprises a hollow cylindrical body part 10, two detachable end closures or caps 11, and a leather or other flexible carrying strap 12. The body part of the case is formed of suitable rigid material of light weight, being preferably formed of magnesium tubing having a wall thickness of about $\frac{1}{16}$". The end caps 11 are formed of suitable rigid material, preferably steel or aluminum. The opposite ends of the carrying strap 12 are attached to the end walls of the caps 11 by rivets 13 which are anchored to the end walls of the caps axially of the caps and the shanks of which have a loose fit in apertures 12ª in the ends of the strap.

Each end cap has a cylindrical skirt portion 11ª which is integral with a flat disk-like end wall of the cap and fits over the adjacent end portion of the cylindrical body part 10 of the case with a close telescopic fit. Each cap has a compressible cork disk 14 cemented or otherwise held therein at the inner face of the disk-like end wall of the cap, which disk is adapted to seat against the adjacent end edge of the body part 10, when the cap is fully applied to the body part, to tightly seal the adjacent end of the body part. Disk 14 also serves as a sound deadening cushion abuttable by the ends of rod sections confined in the case.

The caps 11 have bayonet joint connections with opposite end portions of body part 10, the skirt portion 11ª of each cap having an annular slot a portion 15 of which extends circumferentially of the skirt and a portion 16 of which extends longitudinally of the skirt from one end of portion 15 to the edge of the skirt. The portion 15 of the bayonet joint slot in one of the caps extends in one direction around the case from the portion 16 of that slot, and the portion 15 of the bayonet joint slot in the other cap extends in the opposite direction around the case from the portion 16 of that slot. Each slot 15—16 is of special form in that portion 15 thereof is wider than portion 16 thereof. Specially constructed and mounted bayonet joint studs hereinafter described are coactive with the slots to releasably lock the end caps to the body part of the case.

The body part 10 of the case has adjacent opposite ends thereof two circular apertures 17 through each of which protrudes a different one of two bayonet joint studs or pins 18 each of which has a head at its outer end and a shank which is coactive with the slot 15—16 in a different one of the end caps to form a bayonet joint locking connection between the end cap and the adjacent end of the body part. The shank of each stud 18 is of circular cross section and has a major diameter which affords a fairly close sliding fit for the stud in the adjacent aperture 17 in the body part of the case. Within the body part 10 of the case and adjacent opposite ends thereof, are two flat bar-like metal springs 19 which extend longitudinally of the body part and are riveted to the body part adjacent their inner ends by rivets 20. Each of the studs 18 has its inner end rigidly fixed to the adjacent spring 19.

The springs 19 normally extend substantially flatly along the inner face of the body part 10 to normally yieldingly maintain the studs 18 projected outward to a maximum extent through the body part 10. The shank of each of the studs 18 has a reduced portion 18ª of circular cross section which extends inward from the head of the stud and which, in the normal position of the stud, is projected outward beyond the outer face of the skirt portion of the adjacent cap. The major diameter of the shank of each stud is such that the inner portion of the shank of the stud will fit closely in the wider part 15 of the coactive bayonet joint slot in the adjacent skirt cap. When the inner portion of the shank of a stud is engaged in the wider part 15 of the bayonet joint slot of the associated cap, it holds the cap to the body part with the cork disk in the cap abutted tightly against the adjacent end edge of the body part.

The major diameter of the shank of each stud is such that the stud normally cannot pass through the narrower part 16 of the bayonet joint slot in the associated end cap, but the diameter of the reduced portion 18ª of the shank of each stud is such that this portion of the stud is adapted to pass through the narrower part 16 of the bayonet joint slot whenever the cap is turned to align the stud shank with said part of the slot and the stud is manually pressed in by the finger of a user to register the reduced portion 18ª of the stud shank with the skirt portion of the cap. The length of the reduced portion 18ª of each stud shank is slightly greater than the thickness of the skirt portion of the cap.

It will be observed that by reason of the above-described construction of the bayonet joint slots in the caps and of the above-described special construction and mounting of the bayonet joint studs carried by the body part, each cap may be rotated to a limited extent relatively to the body part of the case, but will remain releasably locked on the body part of the case against accidental withdrawal or detachment regardless of the relatively rotated position of the cap and the body part. Each cap can only be detached when the user presses the stud inwardly far enough to register the portion 18ª of the stud with the cap skirt and also relatively rotates the body part and cap to align the stud longitudinally of the case with the narrower portion 16 of the slot in the cap.

It will also be observed that one of the caps is rotative in one direction to align portion 16 of its bayonet slot with the coactive stud, and the other cap is rotative in the opposite direction for this purpose. This arrangement permits the user to grasp one end cap with one hand and the other end cap with the other hand, and rotate the caps simultaneously relative to the case by turning one cap in one direction and the other cap in the opposite direction to bring the narrower portions of the slots into or out of registry with the studs. In the drawing, one of the end caps is shown rotated to register ventilating openings therein with ventilating openings in the adjacent end of the body part, and the other end cap is shown rotated to non-ventilating position.

Adjacent each of its ends, the body part 10 of the case is provided with a set of ventilating apertures 22 all of which are located in a common plane which is normal to the axis of the body part, said apertures being equally spaced around the body part. The skirt of each cap is provided with a corresponding set of ventilating apertures 23, the number and spacing of which corresponds with the number and spacing of the ventilating apertures in the body part, the apertures in the skirt of each cap all being located in a common plane which is normal to the axis of the cap. The ventilating apertures in the caps and body part are arranged so that the set of apertures in the skirt of each cap may be brought into registry with the set of apertures in the adjacent end of the body part by rotating the cap until the closed end of the wider part 15 of the bayonet joint slot in the cap skirt abuts the bayonet joint stud 18 projecting through said part of the slot. When the cap is rotated in the opposite direction until arrested by the stud, the ventilating apertures in the cap skirt are carried out of registry with the ventilating apertures in the adjacent end of the body part.

The bayonet joint slots and ventilating apertures are the only openings through the cap walls, and the ventilating apertures and the apertures 17 are the only openings through the cylindrical wall of the body part 10. The apertures 17 in the body part are normally closed, or substantially closed, by the inner portions of the studs 18 so that, when the caps are latched on the body part and rotated to carry the ventilating apertures in the caps out of registry with the ventilating apertures in the body part, the body part and the caps form an enclosing case which is air and water tight, or substantially so. To aid in sealing the apertures 17, leather or other flexible washers 24 are fitted tightly on the studs 18 at the inner ends of the studs to normally engage the inner face of the body part 10 around the apertures 17 to seal said apertures.

The body part of the case is of suitable length and diameter to permit manual handling and carriage thereof and to permit enclosure in the case of the disjointed sections of one or more jointed fishing rods. The carrying strap 12 is riveted to the body part 10 of the case by means of a rivet 25 adjacent the inner end of the skirt of one of the end caps to provide a short looped portion of the strap between the rivet 25 and the rivet 13 by which the adjacent end of the strap is fastened to the end cap, this loop being of a size to provide a convenient hand grip for holding and carrying the case. The remaining major portion of the strap preferably, as shown, is divided into two sections separably and adjustably connected by means of a buckle 26 and provides a looped portion of strap adapted to permit carrying of the case with said strap portion passed over a person's shoulder. The loose fit of the shanks of the rivets 13 in the ends of the strap 12 permit the above-described limited rotation of the caps relatively to the case without twisting of the strap. Rivet 25 holds the body part, end caps and strap connected when the caps are detached from the ends of the body part.

The enclosing case shown and described is very light in weight and will, when the ventilating apertures are closed, float for a substantial period of time in case the fisherman should drop the carrying case in water. When fishing rods are housed in a tightly sealed case in a wet condition, the moisture sealed in the case causes serious damage to the fishing rods. When rods are housed in a casing constructed as shown and above described in a wet condition, the fisherman may readily rotate the end caps to provide a ventilated case which permits the rods to quickly dry out without damage, while at the same time leaving the end caps securely locked to the body part against accidental disconnection therefrom.

While obviously the carrying case could be permanently closed at one end if desired, it is preferred to provide two detachable end caps with the above-described case ventilating means, since this construction permits easy and thorough cleaning of the case when the caps are both detached, and also provides for ventilating the case at both ends.

The described attachment of the strap 12 to the body part of the case and to the end caps prevents accidental loss of the caps and/or the strap when the end caps are unlocked from the body part.

The carrying case is especially adapted for safe storage and transportation of fishing rods, but may be used for storage and transportation of other articles. By forming the body part of magnesium tubing, a very light case is provided which will resist very heavy bending and crushing forces.

Although I have thus described my invention in the best form of which I am aware, it will be evident to those skilled in this art that many changes and modifications might be made without departing from the spirit of my invention. I desire to be limited, therefore, only by the scope of the appended claims.

I claim:

1. A portable enclosing case of the class described comprising a rigid tubular body part having cylindrical opposite end portions and open ends, two rigid and detachable end caps closing the open ends of said body part and each having a disk-like head and a cylindrical skirt projecting from said head and telescopically fitting about a different one of said cylindrical end portions of the body part, the skirt of each cap being provided with a bayonet joint slot consisting of an inner portion extending circumferentially of the cap skirt and a narrower entrance portion extending from the edge of the skirt to said inner portion of the slot and joining said inner portion of the slot adjacent one end of said inner portion, each cylindrical end portion of the body part having an aperture therein registering with said inner portion of the slot in the associated end cap, two flat spring bars within the body part each anchored adjacent one end thereof to the body part and having its opposite end free, said spring bars normally lying close to the inner surface of the body part with the free ends thereof opposite different ones of said apertures, and two bayonet joint studs extending through said apertures and each fixedly anchored at inner end to a different one of said spring bars adjacent the free ends of the bars, each stud having a portion which extends outward from its associated spring bar and is engaged in the inner part of the slot in the skirt of the adjacent end cap and is of larger cross section than the width of the entrance portion of said slot, and each stud also having a reduced portion which is normally projected outward beyond the skirt of the adjacent end cap and is of sufficiently small cross section to pass through the entrance portion of the slot.

2. A portable enclosing case, as claimed in claim 1, having exteriorly thereof a carrying strap having end portions anchored flatwise thereof and rotatively to the heads of the respective end caps axially of the latter for rotation of the caps on the body relatively to said strap end portions without twisting of the strap.

3. A portable enclosing case, as claimed in claim 1, wherein the end caps and the cylindrical end portions of the body part are provided with ventilating openings arranged for movement of the ventilating openings in the caps into and out of registry with those in the body part by relative rotation of the caps and body part, and wherein the case is free of openings except those afforded by the specified openings, apertures and slots.

4. A portable enclosing case, as claimed in claim 3, wherein each end cap has a sealing disk therein seated against the adjacent end edge of the body part, and each stud has a sealing washer tightly fitted therearound and normally pressed by the adjacent one of said spring bars against the inner face of the body part around the aperture through which the stud extends.

5. A portable enclosing case, as claimed in claim 3, wherein rotation of one end cap in one direction and the other end cap in the opposite direction registers the ventilating openings in the end caps with those in the body part and contrarotation of caps registers the entrance portions of the two cap slots with the two studs.

6. An enclosing case of the class described comprising a rigid and tubular body part, means for sealing one end of said body part, said body part being provided at its other end with a cylindrical end portion which has an open outer end, a rigid and detachable closure cap for sealing said other end of said body part and having a cylindrical skirt telescopically interfitted with said cylindrical end portion of said body part, said cap skirt having formed therein a bayonet joint slot having an inner portion which extends circumferentially of the skirt and a narrower entrance portion which extends longitudinally of the skirt from one end of said inner slot portion to the edge of the skirt, a bayonet joint stud mounted on the body part for longitudinal reciprocation of the stud radially through said cylindrical end portion of the body part into and out of a position in which said stud blocks detachment of the cap, said stud having a main body portion which is impassable laterally of the stud through the entrance portion of the slot in cap skirt and is passable through the inner portion of said slot and also having a relatively reduced portion which is passable laterally of the stud through the entrance portion of said slot, and a spring within and attached to said body part and attached to the stud to hold the stud in an outwardly projected normal position in which the main body portion of the stud is engaged in the inner portion of the slot in the cap skirt to block detachment of the cap and in which the reduced portion of the stud is projected outward beyond the cap skirt, said cap skirt and said cylindrical end portion of the body part of the case being provided with case ventilating openings movable into and out of registry by relative rotation of the closure cap and the body part of the case with said slot and stud in engaged relation.

7. An enclosing case, as claimed in claim 6, wherein a flexible sealing washer closely encircles the stud between the spring and the body part of the case.

GORDON N. TUTTON.

REFERENCES CITED

The following references are of record in the file of this patent:

UNITED STATES PATENTS

| Number | Name | Date |
| --- | --- | --- |
| 1,068,965 | Boehmler | July 19, 1913 |
| 1,714,368 | Hobson | May 21, 1929 |
| 1,903,798 | Turner | Apr. 18, 1933 |

FOREIGN PATENTS

| Number | Country | Date |
| --- | --- | --- |
| 133 | Great Britain | 1886 |